United States Patent
Numazu et al.

(10) Patent No.: US 9,017,508 B2
(45) Date of Patent: Apr. 28, 2015

(54) ADHESIVE TAPE ROLL AND METHOD FOR MANUFACTURING ADHESIVE TAPE ROLL

(75) Inventors: Yasuhiro Numazu, Tokyo (JP); Takahisa Ogawa, Tokyo (JP)

(73) Assignee: Kabushiki Kaisha Nitoms, Tokyo (JP)

( * ) Notice: Subject to any disclaimer, the term of this patent is extended or adjusted under 35 U.S.C. 154(b) by 169 days.

(21) Appl. No.: 13/496,753

(22) PCT Filed: Mar. 31, 2010

(86) PCT No.: PCT/JP2010/002358
§ 371 (c)(1),
(2), (4) Date: Mar. 16, 2012

(87) PCT Pub. No.: WO2011/121659
PCT Pub. Date: Oct. 6, 2011

(65) Prior Publication Data
US 2012/0177860 A1 Jul. 12, 2012

(51) Int. Cl.
| | |
|---|---|
| B65H 18/02 | (2006.01) |
| B65H 18/10 | (2006.01) |
| B65H 18/14 | (2006.01) |
| B65H 54/00 | (2006.01) |
| B65H 35/00 | (2006.01) |
| B65H 35/06 | (2006.01) |
| B65H 35/08 | (2006.01) |
| A47L 25/00 | (2006.01) |
| B08B 7/00 | (2006.01) |
| B65H 35/04 | (2006.01) |
| C09J 5/08 | (2006.01) |

(52) U.S. Cl.
CPC .............. *A47L 25/005* (2013.01); *B08B 7/0028* (2013.01); *B65H 35/04* (2013.01); *B65H 2701/18444* (2013.01); *C09J 5/08* (2013.01)

(58) Field of Classification Search
CPC ... A47L 25/005; B65H 29/006; B65H 29/008
USPC .............. 242/523.1, 526.1, 540; 428/43, 343, 428/906; 15/104.002; 156/446, 459, 229, 156/252, 256, 270
See application file for complete search history.

(56) References Cited

U.S. PATENT DOCUMENTS

| | | | |
|---|---|---|---|
| 3,383,063 A | * | 5/1968 | Balaban ........................ 242/526 |
| 4,546,011 A | | 10/1985 | Wolfrum |
| 5,763,038 A | | 6/1998 | Wood |

FOREIGN PATENT DOCUMENTS

| | | | |
|---|---|---|---|
| JP | 2001-218726 A | | 8/2001 |
| JP | 2001-240821 | * | 9/2001 |
| JP | 2001-240821 A | | 9/2001 |

* cited by examiner

*Primary Examiner* — Linda L Gray
(74) *Attorney, Agent, or Firm* — Manabu Kanesaka

(57) ABSTRACT

Disclosed is a technique of manufacturing an adhesive tape roll by which cut lines for cutting an adhesive tape can be regularly formed at a constant position. Provided are a winding roller (32) that winds the adhesive tape (2) fed out from a mother roll (31) and a cut-lines formation roller (33) that is provided between the mother roll (31) and the winding roller (32) and forms the cut lines (4) in the adhesive tape (2) at a predetermined interval. The winding roller (32) and the cut-lines formation roller (33) are rotated in synchronization with each other via predetermined gears (40).

7 Claims, 2 Drawing Sheets

ADHESIVE TAPE ROLL AND METHOD FOR MANUFACTURING ADHESIVE TAPE ROLL

TECHNICAL FIELD

The present invention relates to an adhesive tape roll for cleaning wound with its adhesive face directed to a front side, and more specifically, to a technique of forming cut lines for cutting for every single circumferential length.

BACKGROUND ART

It is difficult to completely remove hairs, dust, or the like twined around carpets, etc., by the suction of vacuum cleaners because fibers are intertwined with each other. In order to address this problem, adhesive tape rolls for cleaning are used as a method for removing foreign particles of this type.

As illustrated in, for example, Patent Document 1, an adhesive tape roll is obtained by winding an adhesive tape having an adhesive part on one face of a substrate made of a sheet body like a paper such that the adhesive part is exposed to a front side. The adhesive tape roll is structured to rotate the adhesive face on a floor as an object face to be cleaned using a dedicated jig not illustrated, thereby forcibly removing dust or the like.

When an adhesive tape roll of this type is used a few times, the adhesion of an adhesive part is reduced due to smudges attached to the adhesive part. Accordingly, after the adhesion is reduced, a smudged face is torn off along cut lines such as perforations and discarded, which restores the adhesion again to make the adhesive tape roll set in a reusable state.

Conventionally, perforations of this type are formed, for example, by the insertion of a press-cutting blade into an adhesive tape roll. However, the formation of the perforations using the press-cutting blade causes, when the press-cutting blade is extracted, a part of an adhesive tape to be lifted up so as to be caught in the side face of the blade. Therefore, a part of the perforations is more projected than other parts, which may cause the whole adhesive tape roll to be deformed into an onion shape.

In order to prevent this deformation, there have been proposed a method for forming cut lines by laser beam machining, a method for providing a rotary blade on a rail for conveying an adhesive tape and winding the adhesive tape while forming cut lines, and the like. However, such methods have the following problems.

That is, according to laser beam machining, a part of an adhesive tape is burned off by a laser beam. Therefore, a scorch or the like is caused to ruin the appearance of the adhesive tape. Further, a substrate must be subjected to flame-resistant processing because it is made of a paper.

Further, in a case where cut lines are formed by the rotary blade, the rotary blade is rotated at a constant cycle using a clutch or the like, which makes it possible to form the cut lines. However, it is necessary to consider the thickness of an adhesive tape, which is increased for every single circumferential length, to arrange all the cut lines at the same position. Because of this, the control of the adhesive tape becomes cumbersome correspondingly, and productivity is decreased due to the reduction of a conveyance speed or the like.

Patent Document

Patent Document 1: Japanese Patent No. 3272710

DISCLOSURE OF THE INVENTION

Problems to be Solved by the Invention

Accordingly, the present invention has been made to address the above problems and has an object of providing a technique of manufacturing an adhesive tape roll by which cut lines for cutting an adhesive tape can be regularly formed at a constant position.

Means for Solving the Problems

In order to achieve the above object, the present invention has some features described below. The invention according to the first aspect provides a method for manufacturing an adhesive tape roll which is obtained by winding an adhesive tape having an adhesive face formed on one face of a substrate such that the adhesive face is directed to a front side and in which cut lines for cutting are intermittently formed in the adhesive tape at a predetermined interval along a feed direction of the adhesive tape, wherein a winding roller that winds the adhesive tape fed out from a mother roll and a cut-lines formation roller that is provided between the mother roll and the winding roller and forms the cut lines in the adhesive tape at the predetermined interval are provided, and the winding roller and the cut-lines formation roller are rotated in synchronization with each other via predetermined gears.

The invention according to the second aspect provides the method according to the first aspect, wherein a gear ratio of a gear on a side of the winding roller to a gear on a side of the cut-lines formation roller is one to one.

The invention according to the third aspect provides the method according to the first aspect, wherein a gear ratio of a gear on a side of the winding roller to a gear on a side of the cut-lines formation roller is less than one to one.

The invention according to the fourth aspect provides the method according to the first aspect, wherein a gear ratio of a gear on a side of the winding roller to a gear on a side of the cut-lines formation roller is greater than one to one.

The invention according to the fifth aspect provides the method according to any one of the first to fourth aspects, wherein three types of gears having a gear ratio of one to one, less than one to one, and greater than one to one, respectively, are provided about one of the winding roller and the cut-lines formation roller and provided in such a manner as to be capable of selectively engaging with a gear of the other of the winding roller and the cut-lines formation roller.

The invention according to the sixth aspect provides the method according to any one of the first to fifth aspects, wherein, when a circumferential length of an n-th (where n is a positive integer) turn is $L_n$, a radius of the winding core is r, a thickness of the adhesive tape is t, a length of the adhesive tape from the cut lines on a beginning end side to the cut lines on a terminal end side of the n-th turn is $L_n'$, and an angular difference of an interval between the cut lines on the beginning end side to the cut lines on the terminal end side of the n-th turn viewed from the center of the winding core is θ, the gears are engaged with each other so as to satisfy the following Equation 1:

$$L_n' = L_n \times (360 - \theta)/360 \qquad \text{Equation (1)}.$$

However, $L_n = 2\pi\{r + (n-1) \times t\}$.

The invention according to the seventh aspect provides the method according to the sixth aspect, wherein the angular difference θ is in a range of equal to or greater than 6° and equal to or less than 19° (6°≤θ≤19°) or −6°≤θ≤−19°.

The present invention also provides an adhesive tape roll manufactured using the method for manufacturing the adhesive tape roll according to any one of the first to seventh aspects.

With the invention according to the first aspect, there is provided a method for manufacturing an adhesive tape roll which is obtained by winding an adhesive tape having an adhesive face formed on one face of a substrate such that the adhesive face is directed to a front side and in which cut lines for cutting are intermittently formed in the adhesive tape at a predetermined interval along a feed direction of the adhesive tape, wherein a winding roller that winds the adhesive tape fed out from a mother roll and a cut-lines formation roller that is provided between the mother roll and the winding roller and forms the cut lines in the adhesive tape at the predetermined interval are provided, and the winding roller and the cut-lines formation roller are rotated in synchronization with each other via predetermined gears. In this manner, only with the synchronization of the rotations of a winding roller and a cut-lines formation roller via gears, cut lines can be regularly formed at a predetermined position.

With the invention according to the second aspect, a gear ratio of a gear on a side of the winding roller to a gear on a side of the cut-lines formation roller is one to one. In this manner, cut lines can be regularly formed at the same position in an overlapped state. Therefore, the deformation of an adhesive tape roll into an onion shape can be reliably prevented.

With the invention according to the third aspect, a gear ratio of a gear on a side of the winding roller to a gear on a side of the cut-lines formation roller is less than one to one. In this manner, an interval between cut lines is set at a position greater than 360° on the basis of a circumferential length. Therefore, when a used adhesive face and a part of an adhesive tape including a boundary part are removed, an unused adhesive tape roll can be exposed over its whole circumference.

With the invention according to fourth aspect, a gear ratio of a gear on a side of the winding roller to a gear on a side of the cut-lines formation roller is greater than one to one. In this manner, an interval between cut lines is set at a position less than 360° on the basis of a circumferential length, and a previous used adhesive face remains at the tip end part of an unused adhesive tape face. Therefore, because adhesion at the tip end part of the unused adhesive tape face is reduced, a rail drawing phenomenon can be prevented.

With the invention according to the fifth aspect, three types of gears having a gear ratio of one to one, less than one to one, and greater than one to one, respectively, are provided about one of the winding roller and the cut-lines formation roller and provided in such a manner as to be capable of selectively engaging with a gear of the other of the winding roller and the cut-lines formation roller. In this manner, three types of cut lines can be easily manufactured with a single apparatus.

With the invention according to the sixth aspect, when a circumferential length of an n-th (where n is a positive integer) turn is $L_n$, a radius of the winding core is r, a thickness of the adhesive tape is t, a length of the adhesive tape from the cut lines on the beginning end side to the cut lines on the terminal end side of the n-th turn is $L_n'$, and an angular difference of an interval between the cut lines on the beginning end side to the cut lines on the terminal end side of the n-th turn viewed from the center of the winding core is θ, the gears are engaged with each other so as to satisfy the following Equation 1:

$$L_n' = L_n \times (360-\theta)/360 \quad \text{Equation (1)}.$$

However, $L_n = 2\pi\{r+(n-1)\times t\}$.

In this manner, cut lines can be arbitrarily formed at a predetermined interval on the condition that the angular difference θ is made constant.

With the invention according to the seventh aspect, the angular difference θ is in a range of equal to or greater than 6° and equal to or less than 19° (6°≤θ≤19°) or −6°≤θ≤−19°. When the angular difference θ is less than 6° (θ<6°) or (θ<−6°), the interval Δd between the cut lines on the beginning end side to the cut lines on the terminal end side of the n-th turn viewed from the center of the winding core becomes equal to or less than 2 mm. Therefore, the reduction of adhesion cannot be prevented, which may cause a rail drawing phenomenon to occur. On the other hand, when the angular difference θ is greater than 19° (θ>19°) or −19° (θ>−19°), the interval Δd becomes greater than 10 mm. Therefore, an unused adhesive tape must be wastefully torn off, which is economically disadvantageous.

BRIEF DESCRIPTION OF THE DRAWINGS

FIGS. 2(a) to 2(c) show explanatory drawings for explaining a cut-lines structure for an adhesive tape, wherein FIG. 2(a) shows a gear ratio of one to one, FIG. 2(b) shows a gear ratio of less than one to one, and FIG. 2(c) shows a gear ratio of greater than one to one.

MODE FOR CARRYING OUT THE INVENTION

Figure 1:
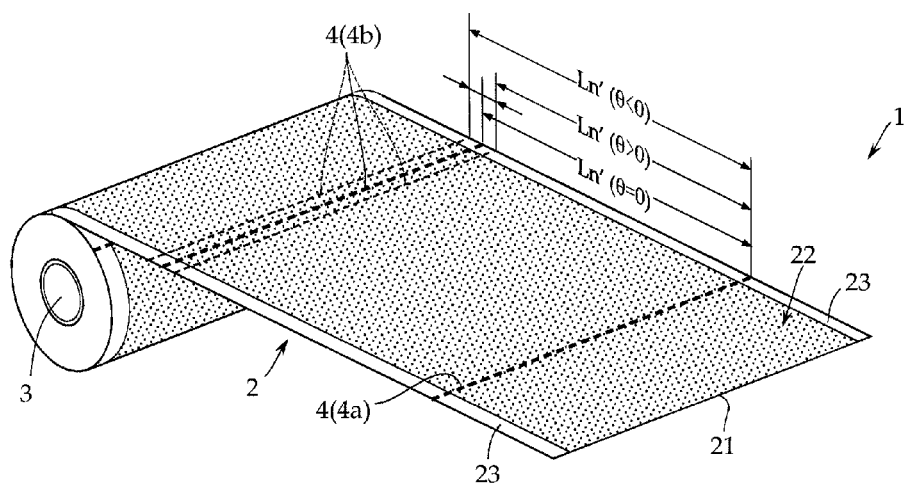
FIG. 1 is a schematic perspective view of an adhesive tape roll according to an embodiment of the present invention.

Next, an embodiment of the present invention will be described with reference to the drawings, but the present invention is not limited to the embodiment. As illustrated in FIG. 1, an adhesive tape roll 1 is made of an adhesive tape 2 having an adhesive face 22 for catching foreign particles on a tape substrate 21 and is obtained by winding the adhesive tape 2 along a winding core 3 in a roll shape such that the adhesive face 22 is directed to a front side (outer side).

In this example, a paper winding core such as a cardboard is used as the winding core 3, but a synthetic-resin winding core may be used instead. Further, the adhesive tape roll 1 may have, i.e., a coreless structure in which the adhesive tape roll 1 is wound without using the winding core 3. Thus, according to the present invention, the winding core 3 is arbitrarily configured.

The tape substrate 21 is made of, for example, a paper and has a laminate film not illustrated on its rear face to reinforce the tape substrate 21 and separate from the next layer. According to the present invention, the presence or absence of the laminate film, the material of the laminate film, and the like are arbitrary matters. For example, the use of a resin film as the tape substrate 21 eliminates the need for the laminate film.

The adhesive face 22 is uniformly coated with an adhesive formed by predetermined adhesive coating and has non-adhesive parts 23 and 23 with no adhesive property at its both ends. According to the present invention, the type and form of the adhesive on the adhesive face, the coating method and coating conditions thereof, and the like may be arbitrarily set.

In this example, the adhesive face 22 is made of so-called a solid adhesive layer that extends along the feed direction of the adhesive tape 2 but may be formed to have a complicated shape such as a streaky shape and a dot shape. Further, for example, two or more adhesives may be used in combination to laminate a stripe-shaped adhesive layer on a solid adhesive layer. The configuration of the adhesive face 22 can be arbitrarily changed according to specifications.

In the adhesive tape 2, cut lines 4 for cutting the adhesive tape 2 are formed at a predetermined interval. The cut lines 4 are so-called perforations where cutting parts and non-cutting parts are alternately continuously formed, and are formed in a straight line along the width direction of the adhesive tape 2 in this example.

In this example, the cut lines 4 are the perforations where the cutting parts and the non-cutting parts are alternately continuously formed, but micro-cuts or the like may be used instead. That is, the mode of the cut lines 4 is arbitrarily set so long as they are weaker than other parts of the adhesive tape 2 and can be easily cut by hand or the like.

The cut lines 4 are formed for every about single circumferential length when the adhesive tape 2 is wound in a roll shape.

In other words, cut lines $4a$ formed in an outermost layer and cut lines $4b$ formed in the next layer are arranged at a predetermined interval $L_n'$. The interval $L_n'$ is changed according to the number of turns of the adhesive tape 2.

More specifically, when the circumferential length of the n-th (where n is a positive integer) turn is $L_n$, the radius of the winding core is r, the thickness of the adhesive tape is t, the length of the adhesive tape from the cut lines on the beginning end side to the cut lines on the terminal end side of the n-th turn is $L_n'$, and the angular difference of the interval between the cut lines on the beginning end side to the cut lines on the terminal end side of the n-th turn viewed from the center of the winding core is θ, the gears are engaged with each other so as to satisfy the following Equation 1:

$$L_n'=L_n \times (360-\theta)/360 \qquad \text{Equation (1).}$$

However, $L_n=2\pi\{r+(n-1)\times t\}$.

Figure 2:
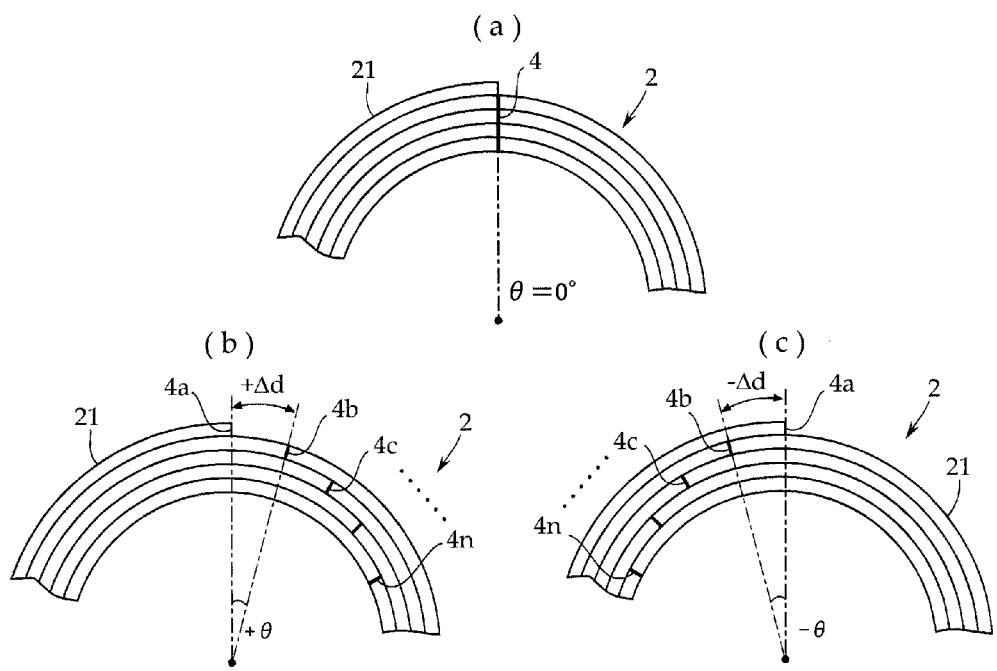

That is, when the angular difference θ is set to be equal to 0° (θ=0°), the cut lines 4 can be arranged, as illustrated in FIG. 2(a), in a straight line along a radius direction at the constant position of the adhesive tape 2 wound in a roll shape. In this manner, the deformation of the adhesive tape roll 1 into an onion shape caused when the cut lines 4 are formed by a press-cutting blade or the like can be effectively prevented, and the adhesive tape 2 can be used up without waste.

When the angular difference θ is set to be greater than 0° (θ>0°), the cut lines 4 are formed, as illustrated in FIG. 2(b), at a position where the cut lines $4b$ of the next layer are deviated by +Δd from the cut lines $4a$ of the outermost layer of the adhesive tape 2, i.e., at a position less than 360° on the basis of the circumferential length of the adhesive tape 2, whereby so-called a reverse step structure is obtained.

In this manner, the used adhesive face of the previous adhesive tape emerges at the tip end of the adhesive tape 2 of the next layer. Therefore, adhesion at the tip end part of the adhesive tape 2 can be reduced, and a rail drawing phenomenon likely to occur when a new adhesive face is rotated on a floor can be prevented.

When the angular difference θ is set to be less than 0° (θ<0°), the cut lines 4 are formed, as illustrated in FIG. 2(c), at a position where the cut lines $4b$ of the next layer are deviated by −Δd from the cut lines $4a$ of the outermost layer of the adhesive tape 2, i.e., at a position greater than 360° on the basis of the circumferential length of the adhesive tape 2, whereby so-called a forward step structure is obtained.

In this manner, a used adhesive face and an unused adhesive face including a boundary part can be removed, and an unused adhesive tape roll can be reliably exposed over its whole circumference.

Here, the angular difference θ is preferably in the range of equal to or greater than 6° and equal to or less than 19° (6°≤θ≤19°), or equal to or greater than −19° and equal to or less than −6° (−19°≤θ≤−6°), and more preferably in the range of equal to or greater than 9° and equal to or less than 12° (9°≤θ≤12°), or equal to or greater than −12° and equal to or less than −9° (−12°≤θ≤−9°). According to this relational expression, when the angular difference θ is set in a range to be less than 6° (θ<6°) or greater than −6° (θ>−6°), the interval Δd becomes equal to or less than 2 mm, which may cause a rail drawing phenomenon to occur. On the other hand, when the angular difference θ is set in a range to be greater than 19° (θ>19°), a used adhesive on the roll remains greater than 10 mm. When the angular difference θ is set in a range less than −19° (θ≤−19°), the interval Δd becomes greater than 10 mm. Therefore, an unused adhesive tape must be wastefully torn off, which is economically disadvantageous.

Figure 3:
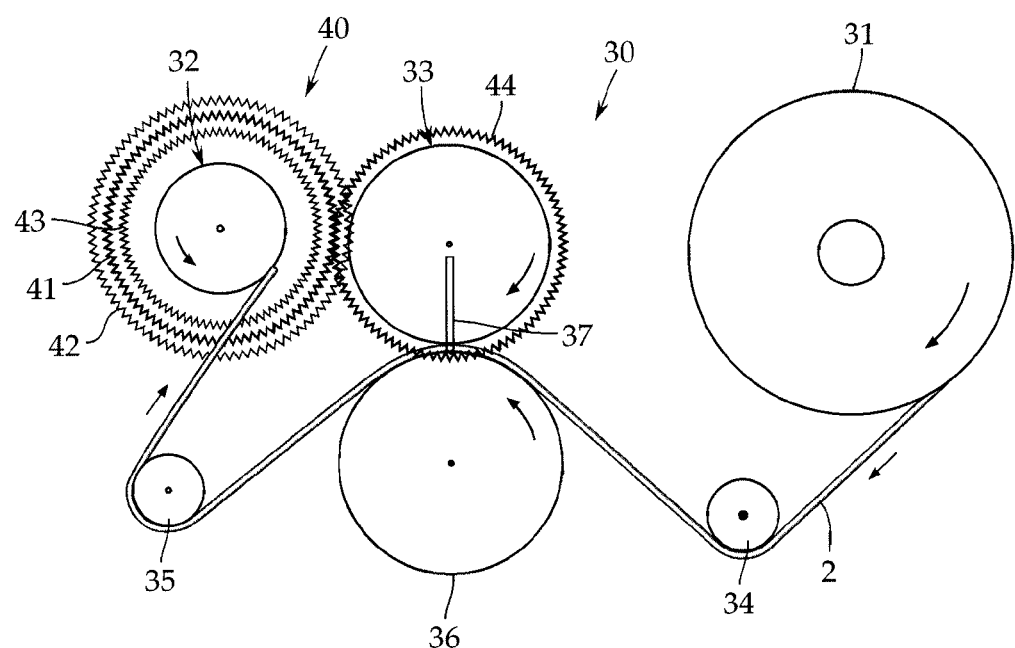
FIG. 3 is an explanatory drawing for explaining a method for manufacturing the adhesive tape roll.

Next, a process for forming the cut lines 4 will be described with reference to FIG. 3. As illustrated in FIG. 3, an apparatus 30 for manufacturing the adhesive tape roll has a mother roll 31 of the adhesive tape 2, a winding roller 32 that winds the adhesive tape 2 fed out from the mother roll 31, and a cut-lines formation roller 33 provided on a conveyance path between the mother roll 31 and the winding roller 32.

In this example, two feed rollers 34 and 35 and a receive roller 36 arranged facing the cut-lines formation roller 33 are also provided on the conveyance path. According to this embodiment, the specific configurations of the mother roll 31, the feed rollers 34 and 35, and the receive roller 36 may be arbitrarily set.

The winding roller 32 is a roller that is rotated and driven by drive means not illustrated and winds the adhesive tape 2 around its circumference. In this example, the winding roller 32 winds the adhesive tape 2 with the adhesive face 22 directed to the front side in order to be formed simultaneously with the formation of the cut lines 4.

The cut-lines formation roller 33 has a blade plate 37 for forming the cut lines 4 integrally formed at a part of its cylindrical roller-main-body and inserts the blade plate 37 into the adhesive tape 2 with its rotation. In this example, a wavy blade for forming the simple cut lines 4 is used as the blade plate 37, but the blade plate 37 may be processed to have more complicated cut lines 4. Thus, the shape of the blade plate 37 may be arbitrarily changed according to specifications.

According to the present invention, the winding roller 32 and the cut-lines formation roller 33 are rotated in synchronization with each other via gears 40. In other words, the winding roller 32 has three types of gears 41 to 43 coaxially provided about its drive shaft, and the cut-lines formation roller 33 has a gear 44 coaxially provided about its drive shaft (both not illustrated). These gears 40 selectively engage with each other via predetermined selection means.

Among the three types of gears 41 to 43, the first gear 41 (hereinafter referred to as the first gear 41) is formed to have a gear ratio of one to one with the gear 44 (hereinafter referred to as the fourth gear 44). In this example, the number of teeth of both of the first gear 41 and the fourth gear 44 is 87.

In this manner, the winding roller 32 and the cut-lines formation roller 33 are synchronously linked to each other with the gear ratio of one to one. Therefore, the cut lines 4 can be easily formed that satisfies the relational expression θ=0° described.

Among the three types of gears 41 to 43, the second gear (hereinafter referred to as the second gear 42) is a gear that has a larger outer diameter than that of the first gear 41 and is formed to have a gear ratio of greater than one to one with the fourth gear 44. In this example, the number of teeth of the second gear 42 is 90, and the number of teeth of the fourth gear 44 is 87.

In this manner, the winding roller 32 and the cut-lines formation roller 33 are synchronously linked to each other with the gear ratio of greater than one to one. In other words, they are linked to each other with a gear teeth ratio of 90 to 87 (with an angular ratio of 360° to 348°). Therefore, the cut lines 4 of the reverse step structure can be easily formed with an angular difference of 12° ($\theta=12°$) that satisfies the relational expression $\theta>0°$ described above.

Among the three types of gears 41 to 43, the third gear (hereinafter referred to as the third gear 43) is a gear that has a smaller diameter than that of the first gear 41 and is formed to have a gear ratio of less than one to one with the fourth gear 44. In this example, the number of teeth of the third gear 43 is 84, and the number of teeth of the fourth gear 44 is 87.

In this manner, the winding roller and the cut-lines formation roller 33 are synchronously linked to each other with the gear ratio of less than one to one. In other words, they are linked to each other with a gear teeth ratio of 84 to 87 (with an angular ratio of 348° to 360°). Therefore, the cut lines 4 of the forward step structure can be easily formed with an angular difference of −12° ($\theta=-12$) that satisfies the relational expression $\theta<0°$ described above.

In this example, as the gears 40, the three types of gears 41 to 43 are provided on the side of the winding roller 32, and the fixed fourth gear 44 is provided on the side of the cut-lines formation roller 33. Alternatively, the fourth gear 44 may be provided on the side of the winding roller 32, and the three types of gears 41 to 43 may be provided on the side of the cut-lines formation roller 33.

EXAMPLE

Next, a more specific embodiment of the present invention will be described. The positions of the cut lines 4 were calculated on the condition that the radius r of the winding core 3 was 20 mm, the thickness t of the adhesive tape 2 was 0.1 mm, and the angular differences $\theta$ when the adhesive tape was wound by 90 turns were set to be equal to 0° ($\theta=0°$), +12° ($\theta=12°$), and −12° ($\theta=-12°$).

(When the angular difference $\theta$ is set to be equal to 0° ($\theta=0°$))

When the angular difference $\theta$ is set to be equal to 0° ($\theta=0°$), the length $L_n$ at the first turn is 125.60 mm according to the equation $L_n=2\pi\{r+(n-1)\times t\}$. Because the interval $\Delta d$ is not caused, the length $L_n'$ is gradually increased in proportion to the number of turns of the adhesive tape 2. Table 1 illustrates calculation results. According to the results, it is found that the cut lines 4 are arranged at the same position when the length $L_n'$ becomes gradually larger in proportion to the increased portion of the thickness t as the number of the turns increases.

In case the cut-lines formation roller 33 and the receive roller 36 are synchronized and the adhesive tape is fed at a constant speed, the cut lines are formed whenever the cut-lines formation roller 33 rotates once.

However, as shown in Table 1, the length of the first turn of a roll is 125.6 mm and the length of one turn at the last turn is 180 mm. Thus, the length of one turn of the adhesive tape is increases, i.e. stretched or elongated, from the first turn to the last turn as the diameter of the roll increases. Accordingly, in case the cut lines are formed at one turn, since the cut-lines formation roller 33 turns once by one turn of the outer diameter of the roll at the winding roller 32, the cut lines are formed at the same position.

TABLE 1

| 2 | π | D | n-th layer | t | circumferential length L | ANGLE θ | L' | Δd |
|---|---|---|---|---|---|---|---|---|
| 2 | 3.14 | 20 | 1 | 0.1 | 125.600 | 0 | | |
| 2 | 3.14 | 20 | 2 | 0.1 | 126.228 | 0 | 126.228 | 0.000 |
| 2 | 3.14 | 20 | 3 | 0.1 | 126.856 | 0 | 126.856 | 0.000 |
| 2 | 3.14 | 20 | 4 | 0.1 | 127.484 | 0 | 127.484 | 0.000 |
| 2 | 3.14 | 20 | 5 | 0.1 | 128.112 | 0 | 128.112 | 0.000 |
| 2 | 3.14 | 20 | 6 | 0.1 | 128.740 | 0 | 128.740 | 0.000 |
| 2 | 3.14 | 20 | 7 | 0.1 | 129.368 | 0 | 129.368 | 0.000 |
| 2 | 3.14 | 20 | 8 | 0.1 | 129.996 | 0 | 129.996 | 0.000 |
| 2 | 3.14 | 20 | 9 | 0.1 | 130.624 | 0 | 130.624 | 0.000 |
| 2 | 3.14 | 20 | 10 | 0.1 | 131.252 | 0 | 131.252 | 0.000 |
| 2 | 3.14 | 20 | 11 | 0.1 | 131.880 | 0 | 131.880 | 0.000 |
| 2 | 3.14 | 20 | 12 | 0.1 | 132.508 | 0 | 132.508 | 0.000 |
| 2 | 3.14 | 20 | 13 | 0.1 | 133.136 | 0 | 133.136 | 0.000 |
| 2 | 3.14 | 20 | 14 | 0.1 | 133.764 | 0 | 133.764 | 0.000 |
| 2 | 3.14 | 20 | 15 | 0.1 | 134.392 | 0 | 134.392 | 0.000 |
| 2 | 3.14 | 20 | 16 | 0.1 | 135.020 | 0 | 135.020 | 0.000 |
| 2 | 3.14 | 20 | 17 | 0.1 | 135.648 | 0 | 135.648 | 0.000 |
| 2 | 3.14 | 20 | 18 | 0.1 | 136.276 | 0 | 136.276 | 0.000 |
| 2 | 3.14 | 20 | 19 | 0.1 | 136.904 | 0 | 136.904 | 0.000 |
| 2 | 3.14 | 20 | 20 | 0.1 | 137.532 | 0 | 137.532 | 0.000 |
| 2 | 3.14 | 20 | 21 | 0.1 | 138.160 | 0 | 138.160 | 0.000 |
| 2 | 3.14 | 20 | 22 | 0.1 | 138.788 | 0 | 138.788 | 0.000 |
| 2 | 3.14 | 20 | 23 | 0.1 | 139.416 | 0 | 139.416 | 0.000 |
| 2 | 3.14 | 20 | 24 | 0.1 | 140.044 | 0 | 140.044 | 0.000 |
| 2 | 3.14 | 20 | 25 | 0.1 | 140.672 | 0 | 140.672 | 0.000 |
| 2 | 3.14 | 20 | 26 | 0.1 | 141.300 | 0 | 141.300 | 0.000 |
| 2 | 3.14 | 20 | 27 | 0.1 | 141.928 | 0 | 141.928 | 0.000 |
| 2 | 3.14 | 20 | 28 | 0.1 | 142.556 | 0 | 142.556 | 0.000 |
| 2 | 3.14 | 20 | 29 | 0.1 | 143.184 | 0 | 143.184 | 0.000 |
| 2 | 3.14 | 20 | 30 | 0.1 | 143.812 | 0 | 143.812 | 0.000 |
| 2 | 3.14 | 20 | 31 | 0.1 | 144.440 | 0 | 144.440 | 0.000 |
| 2 | 3.14 | 20 | 32 | 0.1 | 145.068 | 0 | 145.068 | 0.000 |
| 2 | 3.14 | 20 | 33 | 0.1 | 145.696 | 0 | 145.696 | 0.000 |
| 2 | 3.14 | 20 | 34 | 0.1 | 146.324 | 0 | 146.324 | 0.000 |
| 2 | 3.14 | 20 | 35 | 0.1 | 146.952 | 0 | 146.952 | 0.000 |
| 2 | 3.14 | 20 | 36 | 0.1 | 147.580 | 0 | 147.580 | 0.000 |
| 2 | 3.14 | 20 | 37 | 0.1 | 148.208 | 0 | 148.208 | 0.000 |
| 2 | 3.14 | 20 | 38 | 0.1 | 148.836 | 0 | 148.836 | 0.000 |
| 2 | 3.14 | 20 | 39 | 0.1 | 149.464 | 0 | 149.464 | 0.000 |
| 2 | 3.14 | 20 | 40 | 0.1 | 150.092 | 0 | 150.092 | 0.000 |
| 2 | 3.14 | 20 | 41 | 0.1 | 150.720 | 0 | 150.720 | 0.000 |
| 2 | 3.14 | 20 | 42 | 0.1 | 151.348 | 0 | 151.348 | 0.000 |
| 2 | 3.14 | 20 | 43 | 0.1 | 151.976 | 0 | 151.976 | 0.000 |
| 2 | 3.14 | 20 | 44 | 0.1 | 152.604 | 0 | 152.604 | 0.000 |
| 2 | 3.14 | 20 | 45 | 0.1 | 153.232 | 0 | 153.232 | 0.000 |
| 2 | 3.14 | 20 | 46 | 0.1 | 153.860 | 0 | 153.860 | 0.000 |
| 2 | 3.14 | 20 | 47 | 0.1 | 154.488 | 0 | 154.488 | 0.000 |
| 2 | 3.14 | 20 | 48 | 0.1 | 155.116 | 0 | 155.116 | 0.000 |
| 2 | 3.14 | 20 | 49 | 0.1 | 155.744 | 0 | 155.744 | 0.000 |
| 2 | 3.14 | 20 | 50 | 0.1 | 156.372 | 0 | 156.372 | 0.000 |
| 2 | 3.14 | 20 | 51 | 0.1 | 157.000 | 0 | 157.000 | 0.000 |
| 2 | 3.14 | 20 | 52 | 0.1 | 157.628 | 0 | 157.628 | 0.000 |
| 2 | 3.14 | 20 | 53 | 0.1 | 158.256 | 0 | 158.256 | 0.000 |
| 2 | 3.14 | 20 | 54 | 0.1 | 158.884 | 0 | 158.884 | 0.000 |
| 2 | 3.14 | 20 | 55 | 0.1 | 159.512 | 0 | 159.512 | 0.000 |
| 2 | 3.14 | 20 | 56 | 0.1 | 160.140 | 0 | 160.140 | 0.000 |
| 2 | 3.14 | 20 | 57 | 0.1 | 160.768 | 0 | 160.768 | 0.000 |
| 2 | 3.14 | 20 | 58 | 0.1 | 161.396 | 0 | 161.396 | 0.000 |
| 2 | 3.14 | 20 | 59 | 0.1 | 162.024 | 0 | 162.024 | 0.000 |
| 2 | 3.14 | 20 | 60 | 0.1 | 162.652 | 0 | 162.652 | 0.000 |
| 2 | 3.14 | 20 | 61 | 0.1 | 163.280 | 0 | 163.280 | 0.000 |
| 2 | 3.14 | 20 | 62 | 0.1 | 163.908 | 0 | 163.908 | 0.000 |
| 2 | 3.14 | 20 | 63 | 0.1 | 164.536 | 0 | 164.536 | 0.000 |
| 2 | 3.14 | 20 | 64 | 0.1 | 165.164 | 0 | 165.164 | 0.000 |
| 2 | 3.14 | 20 | 65 | 0.1 | 165.792 | 0 | 165.792 | 0.000 |
| 2 | 3.14 | 20 | 66 | 0.1 | 166.420 | 0 | 166.420 | 0.000 |
| 2 | 3.14 | 20 | 67 | 0.1 | 167.048 | 0 | 167.048 | 0.000 |
| 2 | 3.14 | 20 | 68 | 0.1 | 167.676 | 0 | 167.676 | 0.000 |
| 2 | 3.14 | 20 | 69 | 0.1 | 168.304 | 0 | 168.304 | 0.000 |
| 2 | 3.14 | 20 | 70 | 0.1 | 168.932 | 0 | 168.932 | 0.000 |
| 2 | 3.14 | 20 | 71 | 0.1 | 169.560 | 0 | 169.560 | 0.000 |
| 2 | 3.14 | 20 | 72 | 0.1 | 170.188 | 0 | 170.188 | 0.000 |
| 2 | 3.14 | 20 | 73 | 0.1 | 170.816 | 0 | 170.816 | 0.000 |
| 2 | 3.14 | 20 | 74 | 0.1 | 171.444 | 0 | 171.444 | 0.000 |
| 2 | 3.14 | 20 | 75 | 0.1 | 172.072 | 0 | 172.072 | 0.000 |
| 2 | 3.14 | 20 | 76 | 0.1 | 172.700 | 0 | 172.700 | 0.000 |

TABLE 1-continued

| 2 | π | D | n-th layer | t | circumferential length L | ANGLE θ | L' | Δd |
|---|---|---|---|---|---|---|---|---|
| 2 | 3.14 | 20 | 77 | 0.1 | 173.328 | 0 | 173.328 | 0.000 |
| 2 | 3.14 | 20 | 78 | 0.1 | 173.956 | 0 | 173.956 | 0.000 |
| 2 | 3.14 | 20 | 79 | 0.1 | 174.584 | 0 | 174.584 | 0.000 |
| 2 | 3.14 | 20 | 80 | 0.1 | 175.212 | 0 | 175.212 | 0.000 |
| 2 | 3.14 | 20 | 81 | 0.1 | 175.840 | 0 | 175.840 | 0.000 |
| 2 | 3.14 | 20 | 82 | 0.1 | 176.468 | 0 | 176.468 | 0.000 |
| 2 | 3.14 | 20 | 83 | 0.1 | 177.096 | 0 | 177.096 | 0.000 |
| 2 | 3.14 | 20 | 84 | 0.1 | 177.724 | 0 | 177.724 | 0.000 |
| 2 | 3.14 | 20 | 85 | 0.1 | 178.352 | 0 | 178.352 | 0.000 |
| 2 | 3.14 | 20 | 86 | 0.1 | 178.980 | 0 | 178.980 | 0.000 |
| 2 | 3.14 | 20 | 87 | 0.1 | 179.608 | 0 | 179.608 | 0.000 |
| 2 | 3.14 | 20 | 88 | 0.1 | 180.236 | 0 | 180.236 | 0.000 |
| 2 | 3.14 | 20 | 89 | 0.1 | 180.864 | 0 | 180.864 | 0.000 |
| 2 | 3.14 | 20 | 90 | 0.1 | 181.492 | 0 | 181.492 | 0.000 |

(When the angular difference θ is set to be equal to +12° (θ=+12°))

When the angular difference θ is set to be equal to +12° (θ=+12°), the length $L_n$ at the first turn is 125.60 mm according to the equation $L=2\pi\{r+(n-1)\times t\}$. The length of the subsequent second layer is 126.228 mm when it is calculated according to this equation. However, in order to cause a deviation where the angular difference θ is set to be equal to +12° (θ=+12°), the length of the second layer must be 122.02 mm according to the equation $L2'=L2\times(360-12)/360$ and the interval Δd must be 4.208 mm. Thus, the cut lines 4 are formed to have a reverse step. Table 2 illustrates calculation results (hereinafter, the same).

TABLE 2

| 2 | π | D | n-th layer | t | Circumferential length L | Angle θ | L' | Δd |
|---|---|---|---|---|---|---|---|---|
| 2 | 3.14 | 20 | 1 | 0.1 | 125.600 | 12 | | |
| 2 | 3.14 | 20 | 2 | 0.1 | 126.228 | 12 | 122.020 | 4.208 |
| 2 | 3.14 | 20 | 3 | 0.1 | 126.856 | 12 | 122.627 | 4.229 |
| 2 | 3.14 | 20 | 4 | 0.1 | 127.484 | 12 | 123.235 | 4.249 |
| 2 | 3.14 | 20 | 5 | 0.1 | 128.112 | 12 | 123.842 | 4.270 |
| 2 | 3.14 | 20 | 6 | 0.1 | 128.740 | 12 | 124.449 | 4.291 |
| 2 | 3.14 | 20 | 7 | 0.1 | 129.368 | 12 | 125.056 | 4.312 |
| 2 | 3.14 | 20 | 8 | 0.1 | 129.996 | 12 | 125.663 | 4.333 |
| 2 | 3.14 | 20 | 9 | 0.1 | 130.624 | 12 | 126.270 | 4.354 |
| 2 | 3.14 | 20 | 10 | 0.1 | 131.252 | 12 | 126.877 | 4.375 |
| 2 | 3.14 | 20 | 11 | 0.1 | 131.880 | 12 | 127.484 | 4.396 |
| 2 | 3.14 | 20 | 12 | 0.1 | 132.508 | 12 | 128.091 | 4.417 |
| 2 | 3.14 | 20 | 13 | 0.1 | 133.136 | 12 | 128.698 | 4.438 |
| 2 | 3.14 | 20 | 14 | 0.1 | 133.764 | 12 | 129.305 | 4.459 |
| 2 | 3.14 | 20 | 15 | 0.1 | 134.392 | 12 | 129.912 | 4.480 |
| 2 | 3.14 | 20 | 16 | 0.1 | 135.020 | 12 | 130.519 | 4.501 |
| 2 | 3.14 | 20 | 17 | 0.1 | 135.648 | 12 | 131.126 | 4.522 |
| 2 | 3.14 | 20 | 18 | 0.1 | 136.276 | 12 | 131.733 | 4.543 |
| 2 | 3.14 | 20 | 19 | 0.1 | 136.904 | 12 | 132.341 | 4.563 |
| 2 | 3.14 | 20 | 20 | 0.1 | 137.532 | 12 | 132.948 | 4.584 |
| 2 | 3.14 | 20 | 21 | 0.1 | 138.160 | 12 | 133.555 | 4.605 |
| 2 | 3.14 | 20 | 22 | 0.1 | 138.788 | 12 | 134.162 | 4.626 |
| 2 | 3.14 | 20 | 23 | 0.1 | 139.416 | 12 | 134.769 | 4.647 |
| 2 | 3.14 | 20 | 24 | 0.1 | 140.044 | 12 | 135.376 | 4.668 |
| 2 | 3.14 | 20 | 25 | 0.1 | 140.672 | 12 | 135.983 | 4.689 |
| 2 | 3.14 | 20 | 26 | 0.1 | 141.300 | 12 | 136.590 | 4.710 |
| 2 | 3.14 | 20 | 27 | 0.1 | 141.928 | 12 | 137.197 | 4.731 |
| 2 | 3.14 | 20 | 28 | 0.1 | 142.556 | 12 | 137.804 | 4.752 |
| 2 | 3.14 | 20 | 29 | 0.1 | 143.184 | 12 | 138.411 | 4.773 |
| 2 | 3.14 | 20 | 30 | 0.1 | 143.812 | 12 | 139.018 | 4.794 |
| 2 | 3.14 | 20 | 31 | 0.1 | 144.440 | 12 | 139.625 | 4.815 |
| 2 | 3.14 | 20 | 32 | 0.1 | 145.068 | 12 | 140.232 | 4.836 |
| 2 | 3.14 | 20 | 33 | 0.1 | 145.696 | 12 | 140.839 | 4.857 |
| 2 | 3.14 | 20 | 34 | 0.1 | 146.324 | 12 | 141.447 | 4.877 |
| 2 | 3.14 | 20 | 35 | 0.1 | 146.952 | 12 | 142.054 | 4.898 |
| 2 | 3.14 | 20 | 36 | 0.1 | 147.580 | 12 | 142.661 | 4.919 |

TABLE 2-continued

| 2 | π | D | n-th layer | t | Circumferential length L | Angle θ | L' | Δd |
|---|---|---|---|---|---|---|---|---|
| 2 | 3.14 | 20 | 37 | 0.1 | 148.208 | 12 | 143.268 | 4.940 |
| 2 | 3.14 | 20 | 38 | 0.1 | 148.836 | 12 | 143.875 | 4.961 |
| 2 | 3.14 | 20 | 39 | 0.1 | 149.464 | 12 | 144.482 | 4.982 |
| 2 | 3.14 | 20 | 40 | 0.1 | 150.092 | 12 | 145.089 | 5.003 |
| 2 | 3.14 | 20 | 41 | 0.1 | 150.720 | 12 | 145.696 | 5.024 |
| 2 | 3.14 | 20 | 42 | 0.1 | 151.348 | 12 | 146.303 | 5.045 |
| 2 | 3.14 | 20 | 43 | 0.1 | 151.976 | 12 | 146.910 | 5.066 |
| 2 | 3.14 | 20 | 44 | 0.1 | 152.604 | 12 | 147.517 | 5.087 |
| 2 | 3.14 | 20 | 45 | 0.1 | 153.232 | 12 | 148.124 | 5.108 |
| 2 | 3.14 | 20 | 46 | 0.1 | 153.860 | 12 | 148.731 | 5.129 |
| 2 | 3.14 | 20 | 47 | 0.1 | 154.488 | 12 | 149.338 | 5.150 |
| 2 | 3.14 | 20 | 48 | 0.1 | 155.116 | 12 | 149.945 | 5.171 |
| 2 | 3.14 | 20 | 49 | 0.1 | 155.744 | 12 | 150.553 | 5.191 |
| 2 | 3.14 | 20 | 50 | 0.1 | 156.372 | 12 | 151.160 | 5.212 |
| 2 | 3.14 | 20 | 51 | 0.1 | 157.000 | 12 | 151.767 | 5.233 |
| 2 | 3.14 | 20 | 52 | 0.1 | 157.628 | 12 | 152.374 | 5.254 |
| 2 | 3.14 | 20 | 53 | 0.1 | 158.256 | 12 | 152.981 | 5.275 |
| 2 | 3.14 | 20 | 54 | 0.1 | 158.884 | 12 | 153.588 | 5.296 |
| 2 | 3.14 | 20 | 55 | 0.1 | 159.512 | 12 | 154.195 | 5.317 |
| 2 | 3.14 | 20 | 56 | 0.1 | 160.140 | 12 | 154.802 | 5.338 |
| 2 | 3.14 | 20 | 57 | 0.1 | 160.768 | 12 | 155.409 | 5.359 |
| 2 | 3.14 | 20 | 58 | 0.1 | 161.396 | 12 | 156.016 | 5.380 |
| 2 | 3.14 | 20 | 59 | 0.1 | 162.024 | 12 | 156.623 | 5.401 |
| 2 | 3.14 | 20 | 60 | 0.1 | 162.652 | 12 | 157.230 | 5.422 |
| 2 | 3.14 | 20 | 61 | 0.1 | 163.280 | 12 | 157.837 | 5.443 |
| 2 | 3.14 | 20 | 62 | 0.1 | 163.908 | 12 | 158.444 | 5.464 |
| 2 | 3.14 | 20 | 63 | 0.1 | 164.536 | 12 | 159.051 | 5.485 |
| 2 | 3.14 | 20 | 64 | 0.1 | 165.164 | 12 | 159.659 | 5.505 |
| 2 | 3.14 | 20 | 65 | 0.1 | 165.792 | 12 | 160.266 | 5.526 |
| 2 | 3.14 | 20 | 66 | 0.1 | 166.420 | 12 | 160.873 | 5.547 |
| 2 | 3.14 | 20 | 67 | 0.1 | 167.048 | 12 | 161.480 | 5.568 |
| 2 | 3.14 | 20 | 68 | 0.1 | 167.676 | 12 | 162.087 | 5.589 |
| 2 | 3.14 | 20 | 69 | 0.1 | 168.304 | 12 | 162.694 | 5.610 |
| 2 | 3.14 | 20 | 70 | 0.1 | 168.932 | 12 | 163.301 | 5.631 |
| 2 | 3.14 | 20 | 71 | 0.1 | 169.560 | 12 | 163.908 | 5.652 |
| 2 | 3.14 | 20 | 72 | 0.1 | 170.188 | 12 | 164.515 | 5.673 |
| 2 | 3.14 | 20 | 73 | 0.1 | 170.816 | 12 | 165.122 | 5.694 |
| 2 | 3.14 | 20 | 74 | 0.1 | 171.444 | 12 | 165.729 | 5.715 |
| 2 | 3.14 | 20 | 75 | 0.1 | 172.072 | 12 | 166.336 | 5.736 |
| 2 | 3.14 | 20 | 76 | 0.1 | 172.700 | 12 | 166.943 | 5.757 |
| 2 | 3.14 | 20 | 77 | 0.1 | 173.328 | 12 | 167.550 | 5.778 |
| 2 | 3.14 | 20 | 78 | 0.1 | 173.956 | 12 | 168.157 | 5.799 |
| 2 | 3.14 | 20 | 79 | 0.1 | 174.584 | 12 | 168.765 | 5.819 |
| 2 | 3.14 | 20 | 80 | 0.1 | 175.212 | 12 | 169.372 | 5.840 |
| 2 | 3.14 | 20 | 81 | 0.1 | 175.840 | 12 | 169.979 | 5.861 |
| 2 | 3.14 | 20 | 82 | 0.1 | 176.468 | 12 | 170.586 | 5.882 |
| 2 | 3.14 | 20 | 83 | 0.1 | 177.096 | 12 | 171.193 | 5.903 |
| 2 | 3.14 | 20 | 84 | 0.1 | 177.724 | 12 | 171.800 | 5.924 |
| 2 | 3.14 | 20 | 85 | 0.1 | 178.352 | 12 | 172.407 | 5.945 |
| 2 | 3.14 | 20 | 86 | 0.1 | 178.980 | 12 | 173.014 | 5.966 |
| 2 | 3.14 | 20 | 87 | 0.1 | 179.608 | 12 | 173.621 | 5.987 |
| 2 | 3.14 | 20 | 88 | 0.1 | 180.236 | 12 | 174.228 | 6.008 |
| 2 | 3.14 | 20 | 89 | 0.1 | 180.864 | 12 | 174.835 | 6.029 |
| 2 | 3.14 | 20 | 90 | 0.1 | 181.492 | 12 | 175.442 | 6.050 |

(When the angular difference θ is set to be equal to −12° (θ=−12°))

Similarly, when the angular difference θ is set to be equal to −12° (θ=−12°), the length $L_n$ at the first turn is 125.60 mm according to the equation $L_n=2\pi\{r+(n-1)\times t\}$. The length of the subsequent second layer is 126.228 mm when it is calculated according to this equation. However, in order to cause a deviation where the angular difference θ is set to be equal to −12° (θ=−12°), the length of the second layer must be 130.436 mm according to the equation $L2'=L2\times(360+12)/360$ and the interval Δd must be −4.208 mm. Thus, the cut lines 4 are formed to have a forward step. Table 3 illustrates calculation results (hereinafter, the same).

TABLE 3

| 2 | π | D | n-th layer | t | Circumferential length L | Angle θ | L' | Δd |
|---|---|---|---|---|---|---|---|---|
| 2 | 3.14 | 20 | 1 | 0.1 | 125.600 | −12 | | |
| 2 | 3.14 | 20 | 2 | 0.1 | 126.228 | −12 | 130.436 | −4.208 |
| 2 | 3.14 | 20 | 3 | 0.1 | 126.856 | −12 | 131.085 | −4.229 |
| 2 | 3.14 | 20 | 4 | 0.1 | 127.484 | −12 | 131.733 | −4.249 |
| 2 | 3.14 | 20 | 5 | 0.1 | 128.112 | −12 | 132.382 | −4.270 |
| 2 | 3.14 | 20 | 6 | 0.1 | 128.740 | −12 | 133.031 | −4.291 |
| 2 | 3.14 | 20 | 7 | 0.1 | 129.368 | −12 | 133.680 | −4.312 |
| 2 | 3.14 | 20 | 8 | 0.1 | 129.996 | −12 | 134.329 | −4.333 |
| 2 | 3.14 | 20 | 9 | 0.1 | 130.624 | −12 | 134.978 | −4.354 |
| 2 | 3.14 | 20 | 10 | 0.1 | 131.252 | −12 | 135.627 | −4.375 |
| 2 | 3.14 | 20 | 11 | 0.1 | 131.880 | −12 | 136.276 | −4.396 |
| 2 | 3.14 | 20 | 12 | 0.1 | 132.508 | −12 | 136.925 | −4.417 |
| 2 | 3.14 | 20 | 13 | 0.1 | 133.136 | −12 | 137.574 | −4.438 |
| 2 | 3.14 | 20 | 14 | 0.1 | 133.764 | −12 | 138.223 | −4.459 |
| 2 | 3.14 | 20 | 15 | 0.1 | 134.392 | −12 | 138.872 | −4.480 |
| 2 | 3.14 | 20 | 16 | 0.1 | 135.020 | −12 | 139.521 | −4.501 |
| 2 | 3.14 | 20 | 17 | 0.1 | 135.648 | −12 | 140.170 | −4.522 |
| 2 | 3.14 | 20 | 18 | 0.1 | 136.276 | −12 | 140.819 | −4.543 |
| 2 | 3.14 | 20 | 19 | 0.1 | 136.904 | −12 | 141.467 | −4.563 |
| 2 | 3.14 | 20 | 20 | 0.1 | 137.532 | −12 | 142.116 | −4.584 |
| 2 | 3.14 | 20 | 21 | 0.1 | 138.160 | −12 | 142.765 | −4.605 |
| 2 | 3.14 | 20 | 22 | 0.1 | 138.788 | −12 | 143.414 | −4.626 |
| 2 | 3.14 | 20 | 23 | 0.1 | 139.416 | −12 | 144.063 | −4.647 |
| 2 | 3.14 | 20 | 24 | 0.1 | 140.044 | −12 | 144.712 | −4.668 |
| 2 | 3.14 | 20 | 25 | 0.1 | 140.672 | −12 | 145.361 | −4.689 |
| 2 | 3.14 | 20 | 26 | 0.1 | 141.300 | −12 | 146.010 | −4.710 |
| 2 | 3.14 | 20 | 27 | 0.1 | 141.928 | −12 | 146.659 | −4.731 |
| 2 | 3.14 | 20 | 28 | 0.1 | 142.556 | −12 | 147.308 | −4.752 |
| 2 | 3.14 | 20 | 29 | 0.1 | 143.184 | −12 | 147.957 | −4.773 |
| 2 | 3.14 | 20 | 30 | 0.1 | 143.812 | −12 | 148.606 | −4.794 |
| 2 | 3.14 | 20 | 31 | 0.1 | 144.440 | −12 | 149.255 | −4.815 |
| 2 | 3.14 | 20 | 32 | 0.1 | 145.068 | −12 | 149.904 | −4.836 |
| 2 | 3.14 | 20 | 33 | 0.1 | 145.696 | −12 | 150.553 | −4.857 |
| 2 | 3.14 | 20 | 34 | 0.1 | 146.324 | −12 | 151.201 | −4.877 |
| 2 | 3.14 | 20 | 35 | 0.1 | 146.952 | −12 | 151.850 | −4.898 |
| 2 | 3.14 | 20 | 36 | 0.1 | 147.580 | −12 | 152.499 | −4.919 |
| 2 | 3.14 | 20 | 37 | 0.1 | 148.208 | −12 | 153.148 | −4.940 |
| 2 | 3.14 | 20 | 38 | 0.1 | 148.836 | −12 | 153.797 | −4.961 |
| 2 | 3.14 | 20 | 39 | 0.1 | 149.464 | −12 | 154.446 | −4.982 |
| 2 | 3.14 | 20 | 40 | 0.1 | 150.092 | −12 | 155.095 | −5.003 |
| 2 | 3.14 | 20 | 41 | 0.1 | 150.720 | −12 | 155.744 | −5.024 |
| 2 | 3.14 | 20 | 42 | 0.1 | 151.348 | −12 | 156.393 | −5.045 |
| 2 | 3.14 | 20 | 43 | 0.1 | 151.976 | −12 | 157.042 | −5.066 |
| 2 | 3.14 | 20 | 44 | 0.1 | 152.604 | −12 | 157.691 | −5.087 |
| 2 | 3.14 | 20 | 45 | 0.1 | 153.232 | −12 | 158.340 | −5.108 |
| 2 | 3.14 | 20 | 46 | 0.1 | 153.860 | −12 | 158.989 | −5.129 |
| 2 | 3.14 | 20 | 47 | 0.1 | 154.488 | −12 | 159.638 | −5.150 |
| 2 | 3.14 | 20 | 48 | 0.1 | 156.116 | −12 | 160.287 | −5.171 |
| 2 | 3.14 | 20 | 49 | 0.1 | 155.744 | −12 | 160.935 | −5.191 |
| 2 | 3.14 | 20 | 50 | 0.1 | 156.372 | −12 | 161.584 | −5.212 |
| 2 | 3.14 | 20 | 51 | 0.1 | 157.000 | −12 | 162.233 | −5.233 |
| 2 | 3.14 | 20 | 52 | 0.1 | 157.628 | −12 | 162.882 | −5.254 |
| 2 | 3.14 | 20 | 53 | 0.1 | 158.256 | −12 | 163.531 | −5.275 |
| 2 | 3.14 | 20 | 54 | 0.1 | 158.884 | −12 | 164.180 | −5.296 |
| 2 | 3.14 | 20 | 55 | 0.1 | 159.512 | −12 | 164.829 | −5.317 |
| 2 | 3.14 | 20 | 56 | 0.1 | 160.140 | −12 | 165.478 | −5.338 |
| 2 | 3.14 | 20 | 57 | 0.1 | 160.768 | −12 | 166.127 | −5.359 |
| 2 | 3.14 | 20 | 58 | 0.1 | 161.396 | −12 | 166.776 | −5.380 |
| 2 | 3.14 | 20 | 59 | 0.1 | 162.024 | −12 | 167.425 | −5.401 |
| 2 | 3.14 | 20 | 60 | 0.1 | 162.652 | −12 | 168.074 | −5.422 |
| 2 | 3.14 | 20 | 61 | 0.1 | 163.280 | −12 | 168.723 | −5.443 |
| 2 | 3.14 | 20 | 62 | 0.1 | 163.908 | −12 | 169.372 | −5.464 |
| 2 | 3.14 | 20 | 63 | 0.1 | 164.536 | −12 | 170.021 | −5.485 |
| 2 | 3.14 | 20 | 64 | 0.1 | 165.164 | −12 | 170.669 | −5.505 |
| 2 | 3.14 | 20 | 65 | 0.1 | 165.792 | −12 | 171.318 | −5.526 |
| 2 | 3.14 | 20 | 66 | 0.1 | 166.420 | −12 | 171.967 | −5.547 |
| 2 | 3.14 | 20 | 67 | 0.1 | 167.048 | −12 | 172.616 | −5.568 |
| 2 | 3.14 | 20 | 68 | 0.1 | 167.676 | −12 | 173.265 | −5.589 |
| 2 | 3.14 | 20 | 69 | 0.1 | 168.304 | −12 | 173.914 | −5.610 |
| 2 | 3.14 | 20 | 70 | 0.1 | 168.932 | −12 | 174.563 | −5.631 |
| 2 | 3.14 | 20 | 71 | 0.1 | 169.560 | −12 | 175.212 | −5.652 |
| 2 | 3.14 | 20 | 72 | 0.1 | 170.188 | −12 | 175.861 | −5.673 |
| 2 | 3.14 | 20 | 73 | 0.1 | 170.816 | −12 | 176.510 | −5.694 |
| 2 | 3.14 | 20 | 74 | 0.1 | 171.444 | −12 | 177.159 | −5.715 |
| 2 | 3.14 | 20 | 75 | 0.1 | 172.072 | −12 | 177.808 | −5.736 |
| 2 | 3.14 | 20 | 76 | 0.1 | 172.700 | −12 | 178.457 | −5.757 |
| 2 | 3.14 | 20 | 77 | 0.1 | 173.328 | −12 | 179.106 | −5.778 |
| 2 | 3.14 | 20 | 78 | 0.1 | 173.956 | −12 | 179.755 | −5.799 |
| 2 | 3.14 | 20 | 79 | 0.1 | 174.584 | −12 | 180.403 | −5.819 |
| 2 | 3.14 | 20 | 80 | 0.1 | 175.212 | −12 | 181.052 | −5.840 |
| 2 | 3.14 | 20 | 81 | 0.1 | 175.840 | −12 | 181.701 | −5.861 |
| 2 | 3.14 | 20 | 82 | 0.1 | 176.468 | −12 | 182.350 | −5.882 |
| 2 | 3.14 | 20 | 83 | 0.1 | 177.096 | −12 | 182.999 | −5.903 |
| 2 | 3.14 | 20 | 84 | 0.1 | 177.724 | −12 | 183.648 | −5.924 |
| 2 | 3.14 | 20 | 85 | 0.1 | 178.352 | −12 | 184.297 | −5.945 |
| 2 | 3.14 | 20 | 86 | 0.1 | 178.980 | −12 | 184.946 | −5.966 |
| 2 | 3.14 | 20 | 87 | 0.1 | 179.608 | −12 | 185.595 | −5.987 |
| 2 | 3.14 | 20 | 88 | 0.1 | 180.236 | −12 | 186.244 | −6.008 |
| 2 | 3.14 | 20 | 89 | 0.1 | 180.864 | −12 | 186.893 | −6.029 |
| 2 | 3.14 | 20 | 90 | 0.1 | 181.492 | −12 | 187.542 | −6.050 |

In this manner, the positions of the cut lines can be arranged in an overlapped state and can be shifted back and forth only with a change in a gear ratio between the winding roller 32 and the cut-lines formation roller 33. Therefore, the adhesive tape roll 1 having the cut lines 4 according to use can be easily manufactured with a single apparatus.

Description of Symbols 1 adhesive tape roll
2 adhesive tape
3 winding core
4 cut lines
30 apparatus for manufacturing adhesive tape roll
31 mother roll
32 winding roller
33 cut-lines formation roller
40 gears

The invention claimed is:

1. A method for manufacturing an adhesive tape roll comprising:
    winding an adhesive tape having an adhesive face formed on one face of a substrate such that the adhesive face is directed to a front side, and
    forming cut lines for cutting in the adhesive tape at a predetermined interval along a feed direction of the adhesive tape,
    wherein a winding roller that winds the adhesive tape fed out from a mother roll and a cut-lines formation roller that is provided between the mother roll and the winding roller and forms the cut lines in the adhesive tape at the predetermined interval are provided, and the winding roller and the cut-lines formation roller are rotated in synchronization with each other via predetermined gears, and
    the predetermined gears having a gear ratio of one to one, less than one to one, and greater than one to one, respectively, are engaged with one of the winding roller and the cut-lines formation roller and provided in such a manner as to be capable of selectively engaging with a gear of the other of the winding roller and the cut-lines formation roller.

2. The method for manufacturing the adhesive tape roll according to claim 1, wherein a gear ratio of a gear on a side of the winding roller to a gear on a side of the cut-lines formation roller is one to one.

3. The method for manufacturing the adhesive tape roll according to claim 1, wherein a gear ratio of a gear on a side of the winding roller to a gear on a side of the cut-lines formation roller is less than one to one.

4. The method for manufacturing the adhesive tape roll according to claim 1, wherein a gear ratio of a gear on a side of the winding roller to a gear on a side of the cut-lines formation roller is greater than one to one.

5. A method for manufacturing an adhesive tape roll according to claim 1, wherein, when a circumferential length of an n-th (where n is a positive integer) turn is $L_n$, a radius of a winding core is r, a thickness of the adhesive tape is t, a length of the adhesive tape from the cut lines on a beginning end side to the cut lines on a terminal end side of the n-th turn is $L_n'$, and an angular difference of an interval between the cut lines on the beginning end side to the cut lines on the terminal end side of the n-th turn viewed from a center of the winding core is θ, the gears are engaged with each other to satisfy the following Equation 1:

$$L_n' = L_n \times (360-\theta)/360 \qquad \text{Equation (1)},$$

However, $L_n = 2\pi\{r+(n-1)\times t\}$.

6. The method for manufacturing the adhesive tape roll according to claim 5, wherein the angular difference θ is in a range of equal to or greater than 6° and equal to or less than 19° or equal to or greater than −19° and equal to or less than −6°.

7. The method of manufacturing the adhesive tape roll according to claim 1, wherein the adhesive tape is gradually stretched as the adhesive tape is turned on a roll.

* * * * *